Oct. 3, 1967   E. D. DAVIES   3,344,439
WATER SAVING DEVICE FOR WATER CLOSETS
Filed July 12, 1965   2 Sheets-Sheet 1

Evan D. Davies
INVENTOR.

Oct. 3, 1967  E. D. DAVIES  3,344,439
WATER SAVING DEVICE FOR WATER CLOSETS
Filed July 12, 1965  2 Sheets-Sheet 2
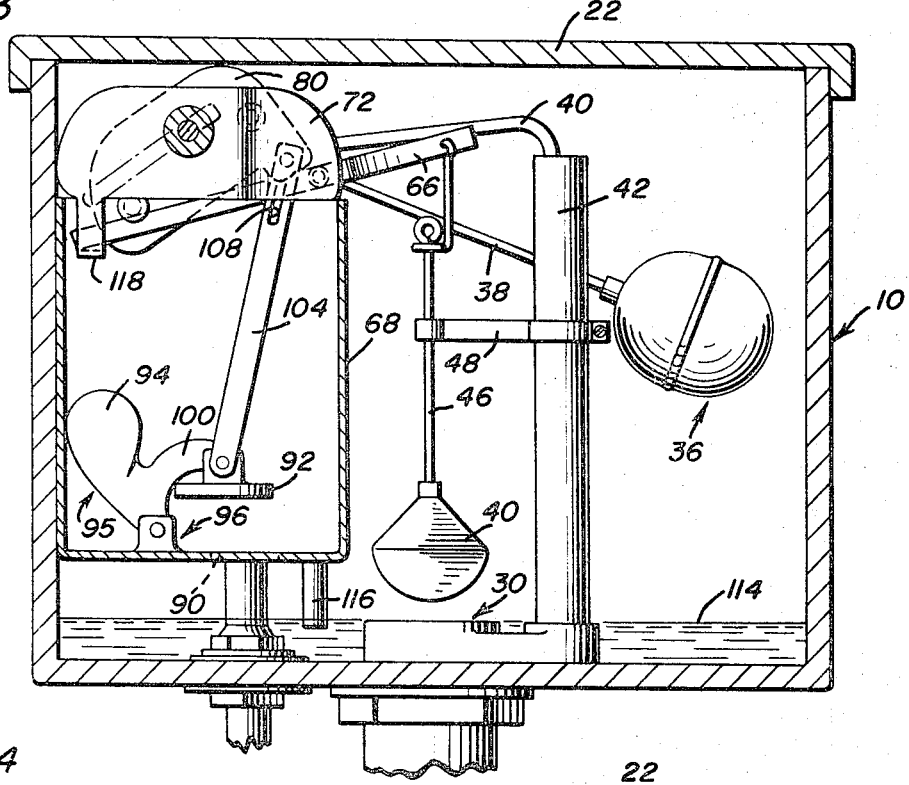
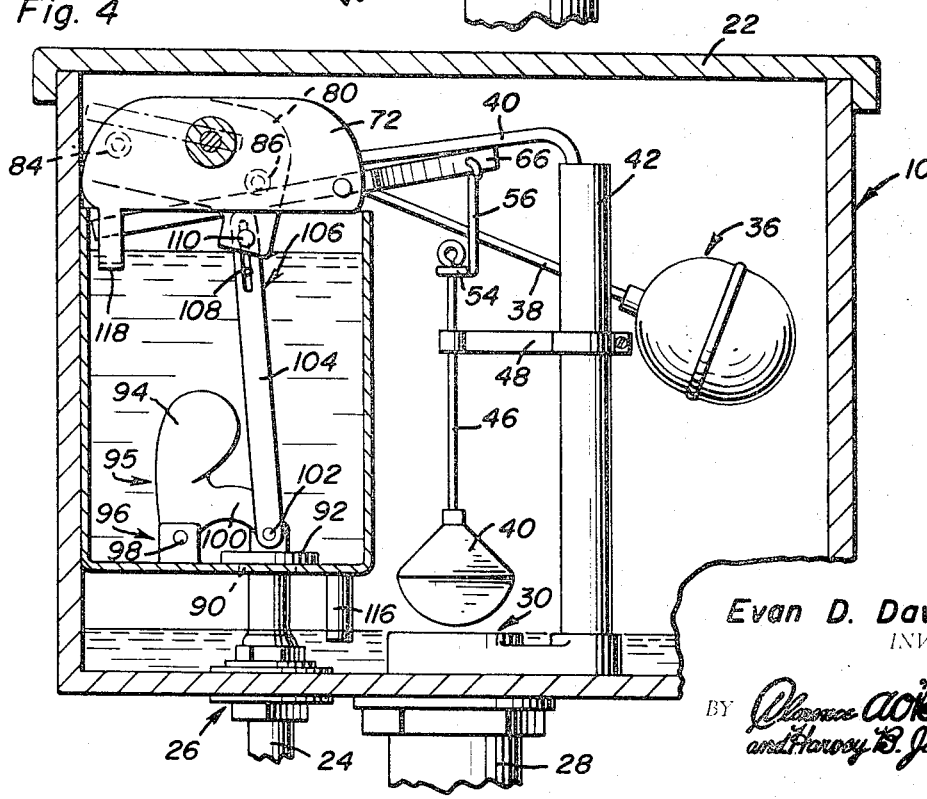
Evan D. Davies
INVENTOR.

United States Patent Office 3,344,439
Patented Oct. 3, 1967

3,344,439
WATER SAVING DEVICE FOR WATER CLOSETS
Evan D. Davies, Azusa, Calif.
(8641 SW. 16th Court, Fort Lauderdale, Fla. 33314)
Filed July 12, 1965, Ser. No. 471,024
10 Claims. (Cl. 4—40)

This invention relates to water closets and more specifically to a water saving device for installation in the water tank of water closets wherein either a portion of or the entire contents of the tank may be used when operating the water closet.

It is well known that the main water tank for water closets or toilets holds approximately five gallons of water. Quite obviously, the entire contents of the tank is not always needed to adequately flush out the toilet bowl. Prior devices have been provided to solve the problem of wasted water; however, these devices have proved unsatisfactory since they could not be readily adapted for existing water closet systems.

It is therefore the principal object of the instant invention to provide an auxiliary tank for use with the main tank of water closet systems which may be readily mounted in existing water closet tanks by the unskilled homeowner as well as by the skilled plumber.

It is another object of the present invention to provide a water saving device for water closets which provides a saver tank to be used in conjunction with a main water closet tank and which allows either the entire capacity or a portion of the water closet tank to be utilized when flushing.

It is a still further object of the present invention to provide a novel operating mechanism for water closet tanks which allows selective activation of the water closet tank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical sectional view taken substantially along the plane of the line 3—3 of FIGURE 1 and showing the components of the present invention in a first position; and FIGURE 4 is a vertical sectional view similar to that of FIGURE 3 showing the components of the present invention in a second position.

Figure 1:
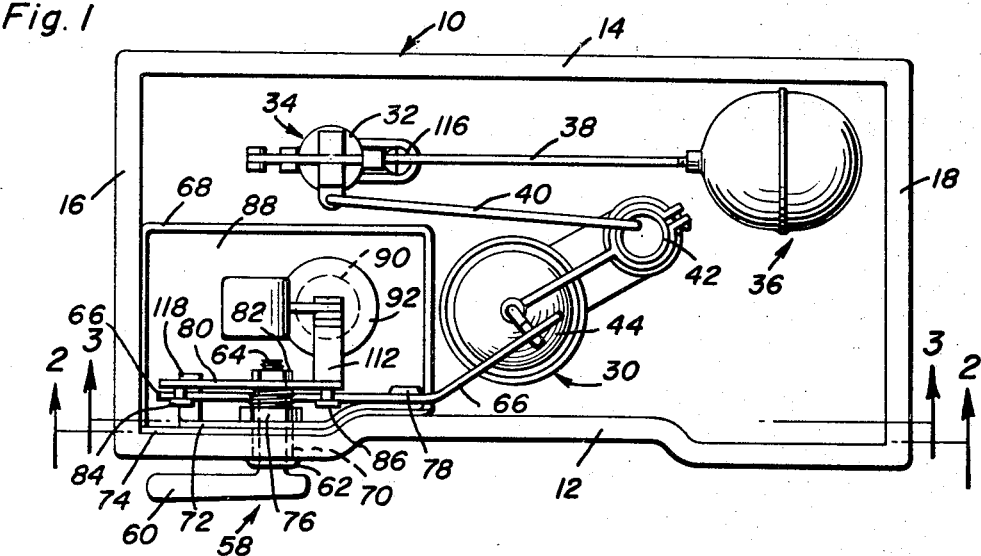
FIGURE 1 is a top plan view of a water closet tank including the saver tank device of the present invention mounted in place therein.

Referring now to the views of the drawing and specifically to FIGURE 1, reference numeral 10 refers to the main water tank of a water closet device. This tank 10 is of conventional design and includes front and back walls 12 and 14, side walls 16 and 18 and a bottom 20. Also, the tank is provided with a cover 22 which may be removed in order to expose the component parts to view. The tank 10 includes water inlet pipe 24 which extends through the bottom wall 20 of the tank and is mounted therein by conventional mounting bolts and washer connection generally designated at 26. Also provided in the bottom 20 of the tank is a water discharge pipe 28 which fits over the water outlet generally designated at 30. The water inlet pipe 24 continues through the bottom wall 20 as pipe 32 and has conventional valve means 34 positioned over the top thereof. The valve means 34 is operated by the conventional float 36 which is attached thereto by threaded coupling rod 38. When the float 36 is lowered, as shown for example in FIGURE 3, the valve 34 will cause water to flow through pipe 116 into the tank 10. When the float is raised by flotation as shown in FIGURE 1, no water will flow through pipe 116. Thus, it is apparent that when the tank is emptied, the float 36 is lowered, allowing water to flow into the tank and also into the bowl through bowl refill tube 40. The bowl refill tube 40 extends from the valve 34 to an overflow pipe 42 which is coupled to the discharge opening 30.

Further components of the water closet tank include the ball valve 44 having a stem 46 threadedly received in the upper portion thereof. The stem 46 extends through the guide bracket 48 which is mounted on the overflow pipe 42 and has an end guiding portion 50 which provides a guiding and retaining function for the stem 46. The stem 46 terminates in an eye ring 52 which is pivotally and rotatably mounted in the ring portion 54 of the connecting link 56. A handle assembly 58 is provided for the tank and includes a gripping or exterior handle portion 60 which is mounted adjacent the front wall 12 of the tank and extends therethrough. A bushing sleeve 62 is mounted through the front wall 12 and is held therein by nut 76. The bushing sleeve 62 provides a rotatable mounting or bearing surface for the handle 58, the handle extending through the sleeve and having an interior extended portion 64. Normally, the lever arm 66 would be directly connected between the interior handle portion 64 and the connecting link 56 thereby causing the ball valve to be lifted in response to movement of the handle.

In accordance with the present invention the direct connection between the interior handle portion 64 and linking member 66 is replaced in the following manner. An auxiliary tank 68 is mounted or hung on the sleeve 62 through a mounting port 70 and is retained tightly against the back of the front wall 12 by having a back plate 72 positioned against the back wall 74 of the auxiliary tank and a locking nut 76 received on the outer threaded portion of the sleeve 62. The lever arm 66 is mounted on the back plate 72 by pivot pin 78, which pin allows the lever arm 66 to swing or pivot about this point. Thus it is apparent from FIGURES 1 and 2 that when the left portion of lever arm 66 moves downwardly the right portion will move upwardly about pin 78 thereby lifting the ball valve 44 off the discharge port 30 allowing the tank to be emptied.

In order to provide means for camming the lever arm 66 in this manner, a pivot or camming plate 80 is mounted over the interior handle portion 64 and against the end of bushing sleeve 62 and tightly held thereon by locking nut 82. Thus, it is apparent that when the handle 58 is rotated in the sleeve 62, the pivot plate 80 will move therewith.

The pivot plate 80 includes first pin 84 integrally attached to the left central portion thereof (when viewing the plate as in FIGURES 2, 3 and 4) and a second pin 86 on the right central portion of the pivot plate 80 substantially in line with the first pin 84. Thus, when the handle 58 is rotated from the position shown in ghost in FIGURE 2 either upwardly as in FIGURE 4 or downwardly as in FIGURE 3 the camming plate 80 will be rotated therewith and either first pin 84 or second pin 86 will contact the portion 86 of the lever arm 66 to the left of pivot point 78 and move it downwardly, thereby causing the ball valve 44 to be lifted by connecting link 56 and stem 46.

The auxiliary tank 68 is provided to be disposed within the main tank 10 and preferably has a volume equal to approximately one-fifth of the volume of the main tank 10. It is readily apparent that the auxiliary tank 68 may be of any desired volume. The auxiliary tank 68 may be constructed from any desirable lightweight material such as plastic or any non-corrosive and non-rusting metal.

The auxiliary or saver tank 68 includes a port 90 in the bottom wall thereof which opens into the interior of the main tank 10 and an open top 88 which preferably lies below the normal water level of the main tank 10. It will be appreciated that the water level within the tank 10 can be adjusted merely by adjusting the position of float 36 and connecting rod 38. The auxiliary tank 68 includes a flap valve 92 for selectively covering the port 90. The valve 92 is connected to an over-center weight member 94. The combination over-center weight and valve, designated at 95, is pivoted at its lower end by pivotal connection 96 and pivot pin 98. The over-center weight 94 includes a portion 100 to which the valve 92 is pivotally connected as for example by connecting pin 102.

Also connected to the flap valve 92 by pin 102 is a connecting link member 104. The top of connecting link member 104 has a lost motion connection to the pivot plate 80. This lost motion connection is generally designated at 106 and includes an elongated slot 108 in the link 104 and a pin 110 which rides in the slot 108 and is formed on an extension 112 of the pivot plate 80. Thus, by viewing FIGURES 2–4, it will be readily apparent that by moving the handle 58 from the horizontal position of FIGURE 2 to the downward position of FIGURE 3 the lever arm 66 is cammed so as to move the ball valve 44 upwardly and further pin 110 slides along slot 108 into contact with the upper portion thereof thereby pulling link 104 upwardly and causing flap valve 92 to open and over-center weight 94 to be pivoted to its position shown in FIGURE 3. Thus the water which is contained in the main tank 10 will drain through the discharge opening 30 and the water which is contained in the auxiliary tank 68 will drain through the port 90 into the interior chamber of tank 10 and out of the discharge opening 30. Thus, it is apparent that by moving the handle to the position shown by FIGURE 3 the entire water supply of main tank 10 and auxiliary tank 68 may be utilized. The water level will fall to the position 114 shown in FIGURE 3, at which time the lowered position of float 36 will cause the valve 34 to open and water will flow through inlet pipe 32 through the valve 34 and into the tank through pipe 116. Since the port 90 is open at this time as the water fills into the main tank 10 water will also enter through the port 90 and fill the auxiliary tank 68. When the float is moved upwardly by the level of the water to the position shown in FIGURE 2 the water will automatically shut off. However, if the valve 92 is closed, as for example, by the handle 58 being moved upwardly to the position shown in FIGURE 4 prior to filling of the tank 10 and auxiliary tank 68, water will flow over the open top 88 of the auxiliary tank 68 thereby filling it in this manner.

Figure 2:
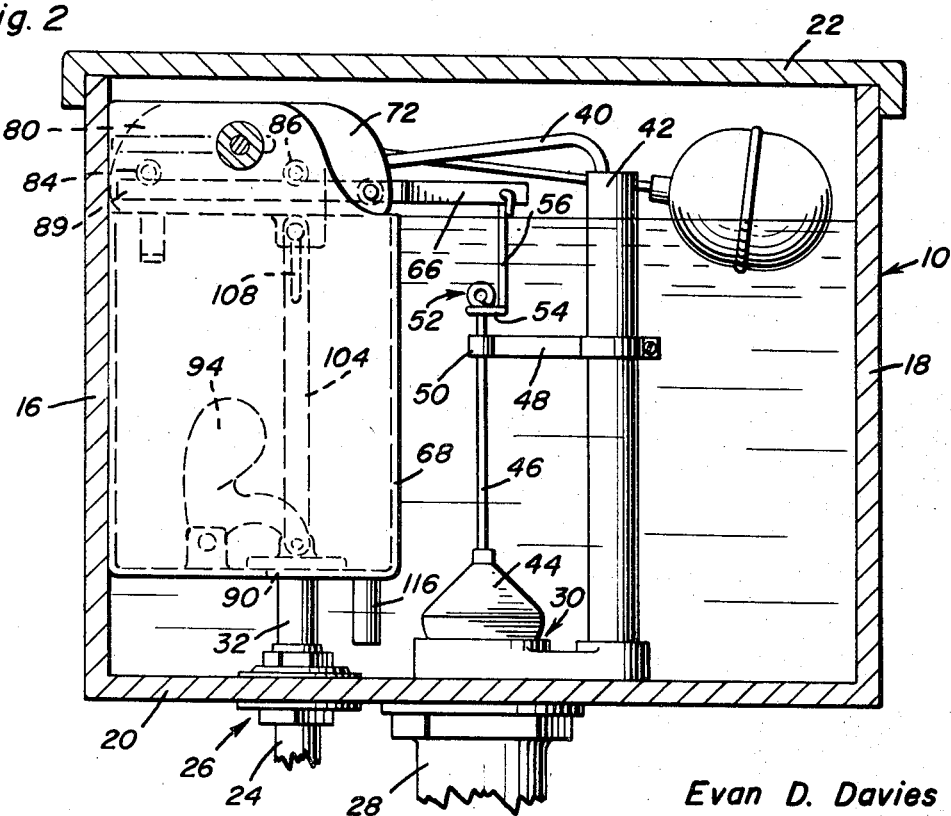
FIGURE 2 is a vertical sectional view taken substantially along the plane of the line 2—2 of FIGURE 1.

In order to utilize only the contents of the main tank 10 the handle 58 may be moved from the position shown in FIGURE 2 directly to the position shown in FIGURE 4. Thus, if the flap valve 92 is in open position and the auxiliary tank filled, movement of the handle to the position shown in FIGURE 4 will cause the pin 110 to actuate link 104 downwardly thus closing the flap valve 92 over port 90. This same movement of the handle will simultaneously cause second pin 86 to contact the lever arm 66 and thereby open the discharge port 30. At this time only the water from the main tank 10 will drain to the discharge port. It will be appreciated, of course, that the handle 58 may be only moved in the downward position, i.e. the position shown in FIGURE 3, and due to the over-center position of the weight 94 the weight will remain in the position shown in FIGURE 3 and the flap valve 92 will remain open, thereby allowing conventional use of the water closet. It is only when the handle is moved to the position shown in FIGURE 4 that the flap valve 92 is closed over port 90.

The back plate 72 has an outturned portion 118 which extends under the lefthand portion 80 of the lever arm 66 and constitutes a stop for the lever 66. Thus, when the handle 58 is moved either upwardly or downwardly thereby causing the pins 84 or 86 to move against lever arm 66 the movement of the lever arm and hence the handle will be limited by the stop 118.

It is apparent from the foregoing that the flap valve 92 is associated with the over-center weight 94 and will operate independently of the water contained within the auxiliary tank 68, the valve responding only to the movement of pivot plate 80 and the movement imparted to link 104 through pin 110. This novel operating mechanism allows the water closet to be used either in a conventional fashion or to be used in the manner intended by this invention. By use of this invention it is possible to utilize either the entire content of tank 10, or merely ⅘ of the contents, when so desired. This will of course, result in a substantial saving of water over an extended period of time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a water closet having a main water tank with an inlet and an outlet for respectively receiving and discharging water, auxiliary tank means positioned within said main tank in water receiving position, said auxiliary tank having port means opening into the interior of said main tank, means for selectively opening and closing said port means, and means for selectively opening and closing said outlet whereby said main tank can be drained independently of or in conjunction with said auxiliary tank.

2. The combination of claim 1 wherein said auxiliary tank has an open top and a closed bottom, said port means positioned in the bottom of said tank, said auxiliary tank being positioned in said main tank whereby said auxiliary tank can be filled with water from said main tank through port or said open top.

3. The combination of claim 1 and including sleeve means extending through a wall of said main tank, handle means rotatably mounted in said sleeve means and having a portion extending beyond said sleeve means into the interior of said main tank, a portion of said handle means extending outwardly of said tank, and said auxiliary tank being hung in said main tank on said sleeve means.

4. The combination of claim 3 and including camming plate means positioned on said interior portion and rotatable therewith, lever means pivotally mounted in said main tank and having one end extending adjacent said camming plate, said outlet opening means being operatively connected to the other end of said lever whereby movement of said camming plate against said one end of said lever will cause said outlet opening means to move in response thereto.

5. The combination of claim 4 wherein said camming plate is mounted on said interior portion substantially at its center, said camming plate having first pin means mounted on one end thereof for engagement with said one end of said lever, and second pin means mounted on said other end thereof for engagement with said one end of said lever whereby if said camming plate is rotated in either direction either said first or second pin means will contact said one end of said lever.

6. The combination of claim 5 wherein said port opening means is operatively connected to said one end of said camming plate whereby when said camming plate is rotated so that said second pin means contacts said one end of said lever said port opening means will be activated.

7. The combination of claim 6 wherein said connection between said port opening means and said one end of said camming plate comprises a one-way lost motion connection.

8. In a water closet having a main water tank including an auxiliary water tank positioned therein, a discharge outlet in said main tank, first valve means positioned to selectively open and close said discharge outlet, port means in said auxiliary tank, second valve means positioned to selectively open and close said port means, said first valve means being operative to close said outlet responsive to a change in the water lever in said main tank and said second valve means being operative independent of a change in the lever of water in said main tank or said auxiliary tank to close said port means.

9. The combination of claim 8 and further including operator means for operating said first valve means and said second valve means, said operator means being movable from a neutral position to first and second operating positions, said first valve means being responsive to be opened upon movement of said operator means to both said first and second positions, and said second valve means being responsive to be opened only upon movement of said operator means to one of said first or second positions.

10. The combination of claim 9 wherein said second valve means comprises a pivotally mounted over-center weight connected to a valve for seating over said port, said weight being connected to said operator means by a one-way lost motion linkage whereby movement of said operator means in one direction will move said linkage and movement of said operator means in a second direction will not move said linkage thereby allowing said weight and valve to remain stationary only when said operator means is moved in one of said directions.

References Cited
UNITED STATES PATENTS

| | | | |
|---|---|---|---|
| 346,261 | 7/1886 | Boyle | 4—40 |
| 354,133 | 12/1886 | Hammann | 4—40 |
| 413,586 | 10/1889 | Wellington | 4—40 |
| 520,358 | 5/1894 | Howell | 4—40 |

LAVERNE D. GEIGER, *Primary Examiner.*

H. K. ARTIS, *Assistant Examiner.*